United States Patent
Fox

(10) Patent No.: US 7,383,232 B2
(45) Date of Patent: Jun. 3, 2008

(54) SYSTEMS, METHODS AND COMPUTER PROGRAM PRODUCTS FACILITATING AUTOMATED CONFIRMATIONS AND THIRD-PARTY VERIFICATIONS

(75) Inventor: Charles Brian Fox, Nashville, TN (US)

(73) Assignee: Capital Confirmation, Inc., Brentwood, TN (US)

( * ) Notice: Subject to any disclaimer, the term of this patent is extended or adjusted under 35 U.S.C. 154(b) by 757 days.

(21) Appl. No.: 10/278,667

(22) Filed: Oct. 23, 2002

(65) Prior Publication Data

US 2003/0078896 A1  Apr. 24, 2003

Related U.S. Application Data

(60) Provisional application No. 60/334,909, filed on Oct. 24, 2001.

(51) Int. Cl.
 *G06Q 99/00* (2006.01)
(52) U.S. Cl. ............... 705/78; 705/64; 705/65; 705/70; 705/72; 705/75
(58) Field of Classification Search ............ 705/1, 705/35, 50–59, 64, 39–41; 713/182–186
See application file for complete search history.

(56) References Cited

U.S. PATENT DOCUMENTS

| | | | | |
|---|---|---|---|---|
| 5,813,006 A * | 9/1998 | Polnerow et al. | ............ | 707/10 |
| 6,029,146 A * | 2/2000 | Hawkins et al. | ............ | 705/35 |
| 6,185,683 B1 * | 2/2001 | Ginter et al. | ............ | 713/176 |
| 6,327,578 B1 * | 12/2001 | Linehan | ............ | 705/65 |
| 6,601,175 B1 * | 7/2003 | Arnold et al. | ............ | 726/7 |
| 6,640,307 B2 * | 10/2003 | Viets et al. | ............ | 726/15 |
| 6,643,504 B1 * | 11/2003 | Chow et al. | ............ | 455/411 |
| 6,714,944 B1 * | 3/2004 | Shapiro et al. | ............ | 707/104.1 |
| 6,839,843 B1 * | 1/2005 | Bacha et al. | ............ | 713/176 |
| 7,177,849 B2 * | 2/2007 | Fieschi et al. | ............ | 705/72 |
| 2002/0082965 A1 | 6/2002 | Loeper | | |
| 2005/0102212 A1 | 5/2005 | Roy | | |
| 2005/0131818 A1 | 6/2005 | Desal et al. | | |

OTHER PUBLICATIONS

The CPA Journal Online Apr. 1993 "SAS 67:guidance on confirmations"—www.nysscpa.org/cpajournal/old/14152808.htm*
International Search Report from International Application No. PCT/US2005/009488 dated Jul. 29, 2005.

* cited by examiner

*Primary Examiner*—Jalatee Worjloh
(74) *Attorney, Agent, or Firm*—Sonnenschein Nath & Rosenthal LLP

(57) ABSTRACT

Systems and methods are defined for facilitating the audit process involving a financial institution, a client of the financial institution, and an accountant. A service provider receives the client's account information from the financial institution upon approval of the client. The financial institution also provides an identification number allowing the accountant to access the information deposited in the service provider. The accountant is provided the identification number in one of a variety of ways allowing the accountant to access the client's information to facilitate an audit process. In this manner, an audit process can be facilitated and reduce the sending of paper copies from the financial institution to the accountant.

13 Claims, 1 Drawing Sheet

SYSTEMS, METHODS AND COMPUTER PROGRAM PRODUCTS FACILITATING AUTOMATED CONFIRMATIONS AND THIRD-PARTY VERIFICATIONS

This application claims the benefit of Provisional Application No. 60/334,909 filed Oct. 24, 2001.

FIELD OF THE INVENTION

Systems, methods and computer program products of the present invention provide a secure electronic intermediary service between auditors and financial institutions to reduce time, resources and costs necessary to complete third-party verifications.

BACKGROUND OF THE INVENTION

Every year, public and private companies throughout the world have their financial statements audited. In the confirmation process of an audit, public accountants confirm three line items on a balance sheet: the cash balance, a sampling of the account receivables, and a sampling of account payables. This confirmation process is the only step still being completed using paper by accounting firms. The current practice is to send paper confirmations through the post office requiring the manual filling out of the paper confirmation form by a financial institution's clerk or the receiving company's staff, and then returning the confirmation by mail or fax to the auditor.

Today, the confirmation—consists of approximately 32 steps. The confirmation process begins when the audited client fills out a paper confirmation form supplied by the client's accountant. The current industry practice is to send paper confirmations by mail, Federal Express, or other like carriers. Once received by a bank, brokerage, or receiving company, the arriving mail is then privately sorted, hopefully routed to the appropriate department or departments, and usually dispatched to hired staff engaged in accommodating such requests. Once the confirmation is in proper hands, the task is generally viewed as a tedious process requiring manual, accurate, and prompt completion.

Financial institutions vary in how they process confirmations, though most larger financial institutions have one or more cost centers devoted solely to processing confirmations. Additional costs are incurred during busy seasons when the employees work overtime in conjunction with temporary staffing to meet the demand of answering confirmations.

Currently, when the manual paper confirmation process works optimally (60% to 80% of the time), it takes a minimum of 2 to 3 weeks to complete. When there are complications (reported 20% to 40% of the time), such as incorrect statement date, incorrect account balances, or no response to the request for confirmation, etc., the process can take up to 4 to 6 weeks to complete. Invariably, with such complications, the costs to financial institutions, accounting firms, and the client being audited-increase.

Because of the industry conditions, accounting firms are constantly seeking ways to reduce the costs of an audit. Due to the technological advances within the past few years, accounting firms have recognized the benefits of a paperless audit. No longer do managers and partners need to be at the client location to review the audit work. They can perform their review of the staff's work from anywhere at anytime. Staff accountants no longer have to receive paper copies of the client's data, the client can now provide the staff with electronic versions of the data, which are easier for the staff accountant to manipulate and audit.

Today, most of the national and even some of the regional and local accounting firms, all audit steps except third-party confirmations are paperless. Many accounting firms that have not adopted the paperless process are also now moving to a paperless audit, barring the one process that is still performed manually using paper. This step includes the confirmation of the cash, receivables, and payables balances. Consequently, there is a need to further reduce costs associated with auditing by automating the step of confirming cash, receivables, and payables balances.

The superiority of the electronic confirmation over the paper confirmation is evident through the fact that the electronic confirmation eliminates the current concerns and constraints surrounding paper confirmations. Also, unknown to the accountant, the current practice of confirming balances leaves an opening for fraud, thus creating increased liability for the accountant. For instance, in the current paper confirmation process, most accountants ask the client to fill out the paper confirmation form. The accountant then mails that confirmation to the financial institution to be filled out. The accountant has a couple of stipulations in sending out that confirmation.

First, confirmations usually cannot be mailed out from or faxed back to the client's office. This is to protect the integrity of the confirmation process. The accountant cannot give the client access to the confirmations after the client has filled out the form for fear the client may intercept them and alter the information. This can pose a problem if the accountant's office is not in the same city or even the same building as their client. If the confirmations are mailed back from the financial institution to the accountant's office, the accountant must either go back to his or her office to retrieve them, or have someone in the office bundle up the confirmations as they come back and forward them via mail to the accountant's hotel or neutral location. If the confirmations are faxed back from the financial institution, the accountant must either stand by the fax machine waiting on the financial institution to fax them back so the accountant can witness the confirmations as they are received over the fax machine, or the accountant must use an off site fax machine, at an independent copy center. Such centers typically charge for this service adding additional cost to the audit process.

Second, the accountant is usually not allowed to send confirmations to a post office box for fear the post office box is not really the financial institution's address, but rather a third-party who is attempting to defraud the company or auditor.

Additionally, the conventional confirmation process is subject to other fraudulent practices. Currently, in the conventional process the accountant instructs the client to fill out the paper confirmation before it is sent for confirmation. This includes directing the client to fill out the proper financial institution address. Most accountants rely solely on the client for this information and do not employ any system for countering incorrect information supplied by the client. As it stands now, the client, in an effort to deceive the accountant, could use any erroneous address, which would suggest legitimacy, as long as it is not addressed to a post office box. The accountant may then, unknowingly send the confirmation to the client's own house, erroneous address, friend or relative thus perpetuating and facilitating fraud. The lack of checks and balances in the current process allows for an information imbalance thus creating a liability for the accountant. There is no timely or convenient mechanism to ensure that the address on the confirmation is a valid address, nor is it practical for accountants to verify the information themselves.

Thus, there is a need for a more secure, more efficient method by which third-party confirmations can occur that is resistant to fraud and more timely in nature.

SUMMARY OF THE INVENTION

By using the systems, methods and computer programs of the present invention, the potential for fraud is minimized and the timeliness of the information being provided is improved. The accountant can utilize the systems disclosed herein at any time of day and from any location. In addition, the integrity of the confirmations is stronger because of the validation of the responding party, increased security and standardization. Systems, methods and computer program products of the present invention will provide a secure electronic intermediary service between a requestor (an auditor) and a responder (a financial institution) to create the first truly paperless third-party confirmation. The present invention will reduce the accountant's exposure to fraud and liability and at the same time decrease the turnaround time and eliminate inefficiencies in time management for both the auditors and financial institutions. The present invention accomplishes these tasks by providing a server located between the auditor and financial institution, in communication with each via a communications network, such as the Internet. The server can collect account data from financial institutions, and, at the request of an accountant, who has been accurately identified as authorized to receive the account data, the server will release the account data to the accountant. According to the present invention, the business being audited is not permitted to tamper with the account data, so that the accountant is ensured that the data is accurately reproduced from the financial institution.

According to one embodiment of the present invention, there is disclosed a method for providing automated confirmations utilizing at least one server accessible by an accountant via a communications network. The method includes receiving, over the communications network, account data corresponding to a business, receiving over the communications network, a PIN (personal identification number) that serves as an identification number and permitting the accountant to communicate with at least one server to confirm that account information received by the accountant, from the business, corresponds to the account data. The method further includes releasing the account data to the accountant where the account information matches at least some of the account data.

According to one aspect of the invention, the method includes receiving payment information from the accountant prior to releasing the account data to the accountant. According to another aspect of the invention, receiving, over the communications network, account data corresponding to a business, comprises receiving account data corresponding to the business electronically from a financial institution associated with the business.

According to yet another aspect of the invention, receiving, over the communications network, account data corresponding to a business, comprises receiving account data corresponding to the business electronically from a financial institution associated with the business after the business has authorized the financial institution to transmit the account data. Additionally, the account information can include a PIN, an account number, a financial institution number, and a routing number.

Systems according to the present invention may act as an intermediary between the financial institutions and the accounting firms thereby creating one focal point where parties can complete the confirmation process. As the intermediary for the confirmation process, the system of the present invention becomes the intermediary for the receivable and payable confirmations as well as other third-party verifications. Due to the fragmentation in both the accounting and financial services industries, there is an increasing benefit as more participants use the service from both sides of the process, thereby making it less beneficial for either side on a stand alone basis. In addition, maintaining an intermediary service is not a core competency for either financial institutions or accounting firms. Thus, the present invention provides accountants the ability to take the final step into a paperless audit, and gives the financial institutions the ability to reduce costs.

DETAILED DESCRIPTION OF THE INVENTION

Figure 1:
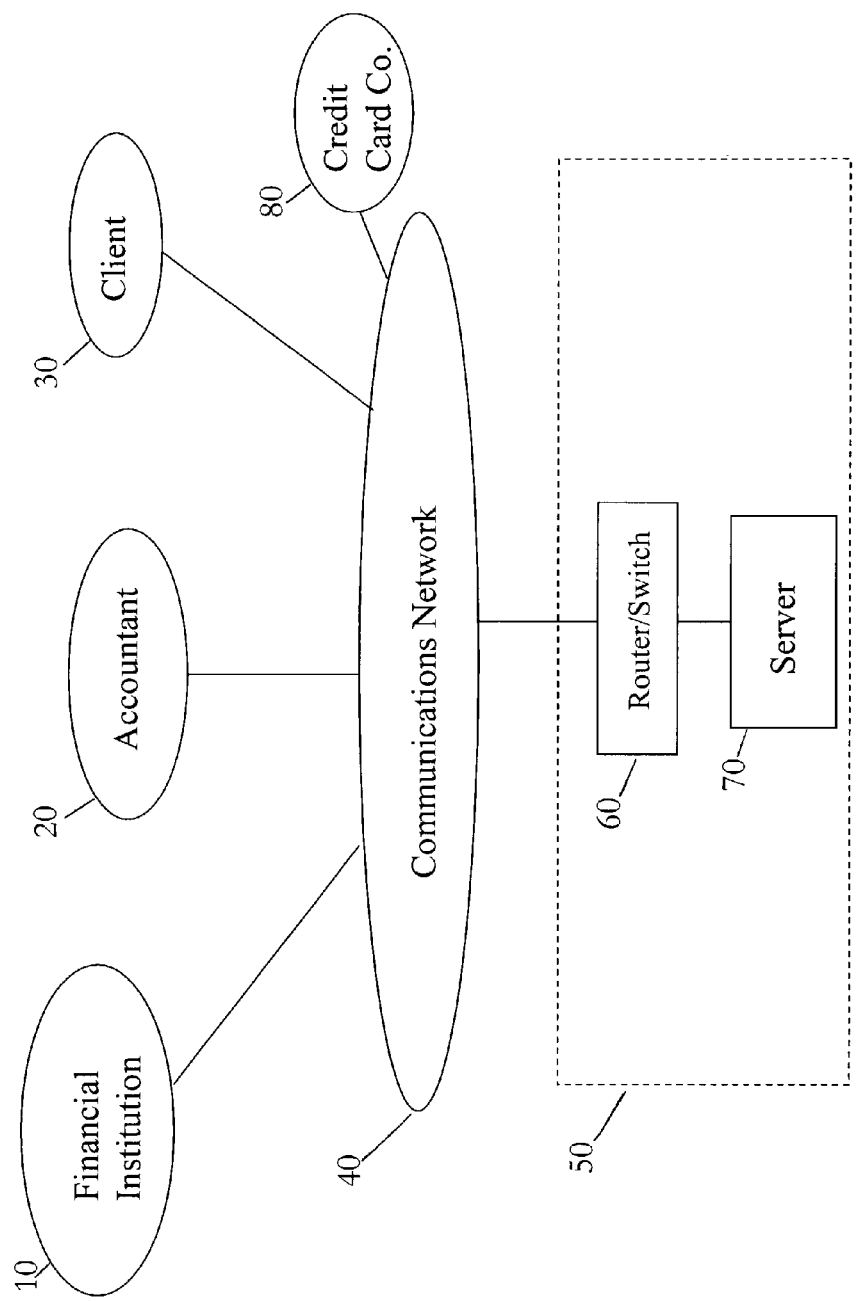
FIG. 1 illustrates the overall system according to the principles of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flowchart illustrations of methods, apparatus (i.e., systems) and computer program products according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or clock or blocks of the diagrams.

Accordingly, blocks of the block diagrams and the flowchart illustrations support combinations of means for performing the specified functions, combinations of steps for performing the specified functions and program instruction means for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

FIG. 1 illustrates the systems and entities according to the present invention. First, one or more financial institutions 10 have contracted to provide data for clients being audited. This entails providing, on a regular basis, the appropriate data of the clients. Thus, although the present example will be discussed with reference to financial institutions providing data indicating accounts, balances, and like information necessary to conduct an audit, it will be appreciated that the data download can be initiated by other methods, such as at a business's request. The information is transmitted using a communications network 40, which could be the Internet, value added network, wide area network, enterprise network, or any other of the well known telecommunications or data communication networks. Although a single network is shown, it is possible that multiple disparate networks may be involved using appropriate gateways and/or routers. Value added networks might be utilized in the situation that the protocols/message formats between the various financial institutions and confirmation service provider 50 are not compatible.

Information provided by the financial institution is sent to the confirmation service provider 50. The service provider provides the confirmation services and methods according to the principles of the invention. The service provider 50 is shown as comprising several elements, namely a router/switch 60 and a server 70. In practice, the functionality may be implemented in a variety of ways, including multiple processors or integrated processors/communications devices. The server 70 could be a variety of servers, such as an IIS/MTS server, including those that provide Internet web site hosting services to allow information to be sent and received from the other entities, such as the financial institution, accountant, and client (i.e., the business to be audited). The server 70, router/switch 60 may provide secure communications using protocols and methods well known to those skilled in the art. Information is stored and encrypted in the system 50, specifically in the server 70.

The accountant 20 performs the auditing functions by requesting the necessary information. The requests from the accountant are communicated using the communications network 40 which, as previously mentioned, can be of a variety of communication technologies.

The client 30 is the business entity that is being audited. It must cooperate in the electronic confirmation process by allowing information to be released by the financial institution 10 as required. Finally, a credit card company 80 is illustrated for providing automated payment functionality, though direct billing, invoicing and other payment methods can and will be used.

Although the description illustrates the principles of the invention by describing the information flows from the 'client', 'financial institution', 'accountant', et cetera, it is readily apparent to those skilled in the art that the data transfer occurs by computers and processing systems operated, owned, or under the control of the client, financial institution, or accountant. Thus, data transmitted by the financial institution involves the financial institution causing various systems and computers to generate the data, whether by direct human control over the systems and computers, or whether by programming the computers to provide the data under the control of other application programs and computers.

The process begins with the financial institution 10 providing information to the service provider 50 regarding the client's 30 information to be confirmed. This is illustrated as being periodically provided by the financial institution to the service provider, although alternative embodiments are possible in which the information is provided as requested by the accountant or client through the service provider. The data received from the financial institution is stored in the server 70 of the system. The information may be initially received by the router switch 60 and processed by the server 70 for storage in the server 70. Various other embodiments and configurations can be used.

The client 30 must also cooperate in the overall process, and it will provide a PIN (personal identification number), or other verifiable identification, to the service provider 50. The identification number is information known by the client 30 and the financial institution 10 and is information authorizing the accountant to be provided information regarding the client. The PIN triggers a release of the data by the financial institution to the system. The client 30 might obtain this number in a variety of ways, for example, by accessing the financial institution's online site to get a PIN. Typically, financial institutions do not readily distribute PINs for third-party verification purposes. However, the systems, methods and computer programs of the present invention allow a business accessing the online financial institution, via a username and password, to be assigned a PIN, and cause it to be transmitted to the business. The client, accountant or the financial institution may originate the transmission. Other means may be utilized, such as a manual process to obtain a PIN. Specifically, the client 30 may request manually (e.g., using a telephone and verbal communications) the financial institution to provide a PIN, which it may communicate using telephonic, email, electronic or postal mail means. Alternatively, the client may request the financial institution send the PIN to the service provider. The financial institution may communicate this electronically (using the communication network), or verbally (using telephone), or other means. These non-fully automated approaches may be used in the initial deployment phases of the system where the financial institution's systems may not have full capabilities to interact on an electronic, automated means with the service provider 50. In the fully automated approach, less time and resources are involved. Further, provision of an automated PIN by the financial institution facilitates other aspects, such as defining a limited duration or limited use identification number to reduce the possibility of inappropriate access to the client's information.

At this point, the service provider 50 has the necessary data for the confirmation and for authorizing access to the data by the accountant 20. It is expected that the PIN may comprise or require additional information, such as business identification data, account identification information, financial institution identification data, and other security related information. According to one aspect of the invention, the PIN could expire after the lapse of a period of time or a certain number of uses. Additionally, the PIN could be changed by the client 30 electronically to prevent the accountant 20 from obtaining confidential statements or records where the business wishes the transaction to be terminated. For instance, an accountant terminated by a business would not be able to access confidential information using an outdated PIN. Like the data received from the financial institution, this information may be received, through a secure router or switch at one or more servers that include a database for storing the identification, PIN and account information of the business. This process may also include a security feature that requires one or more "black boxes", attached at the router/switch 60 or the server 70.

The next step involves the accountant 20 accessing the web site of the service provider 50. The accountant will thus log into the server 70 using Internet protocols well established. These may use additional security features of the Internet or use proprietary protocols to ensure secure data transaction. It is required that the accountant 20 register with the service provider 50 prior to login, so that correct identification information (e.g., name, address, etc.), authorization information (e.g., password, encryption keys) and payment information (e.g., credit card number) is provided to the service provider. The credit card number may be used to charge the accountant for use of the system. In such case, the service provider 50 may interact with a credit card provider 80.

Once the accountant 20 is authorized for accessing the service provider, the accountant provides the server 70 with the PIN, which the accountant received, from the client 30 along with the client's account number and other necessary identification information. The accountant supplies this information to the system of the present invention, which verifies the accuracy of the information (e.g., the PIN, account number, financial institution number, credit card number, router number, etc.).

The system compares the information with that data stored within the server 70 previously provided to the system. If the information matches, the system releases the client's financial data (confirmation data) to the accountant. This can occur via a web page, file transfer, email or other means. This can be printed and saved by the accountant, or stored in memory or on disk for later processing. At this point, the accountant 20 has sufficient information to perform the audit function associated with the confirmation process.

Maintaining information in the service provider that is current (every, for example, 2 hours) would necessitate frequent downloads to the service provider and consume significant processor and communications resources. The appropriate balance of timeliness and resource usage will vary with implementation. It is foreseen that daily updates should be sufficient. Further, alternative mechanisms may be employed where the service provider requests the data as needed from the financial institution. The financial institution would then download the client's information, within a time limit, and then the service provider would provide it to the accountant. This would delay providing information to the accountant compared to the previous method disclosed, but this variation is within the principles of the invention.

The benefits of this approach include financial institutions eliminating the paper confirmation process, which include mailroom sorting and distributing the incoming confirmations, having the financial institution's clerks then look up the needed information on the financial institution's computers then fill out by hand the paper confirmation, and finally sending the confirmation back through the financial institution's mailroom for redelivery. Also eliminated or reduced is the need for second confirmations to be processed by the financial institution, which can occur if confirmation is lost in redelivery to the accountant or is filled out incorrectly, doubling the amount of time spent by the financial institution on a confirmation. Also, if the paper confirmation process malfunctions a third time, additional resources are used because the protocol is for the accountant to: talk with the financial institution's clerk on the phone, fax over a paper confirmation from which the financial institution's clerk again looks up the information on the computer, fill out the paper form by hand, and then fax it back to the accountant. To utilize the present invention, financial institutions may be required to sign a minimum service contract (e.g., three years) to be their sole provider for online confirmations. In return, the financial institutions will save money through the elimination of a cost center. Likewise, accountants using the systems, methods and computer program products of the present invention may be charged a nominal fee per confirmation; however, this amount may be billed to the client as a direct third-party expense. With the current confirmation process, accountants absorb the direct costs of the confirmation internally: the costs of postage, envelopes, and the forms. Overall, financial institutions benefit through becoming more efficient, accountants benefit by becoming more efficient, and the clients benefit if the accountants pass through a portion of the savings. Any company, trust/estate, business may likewise use the present invention, or individual that has the need for third-party verifications.

It should be appreciated that the example discussed above is intended solely as an illustrative example of one system and method of the present invention. Systems, methods and computer program products may therefore be implemented in different manners, as someone skilled in the art would know. Further, as used in herein, 'financial institution' may apply to any business providing data for confirmations and third-party verifications, such as insurance records from insurance companies, health records from health organizations, et cetera.

The communication between the systems of the present invention and financial institutions can occur via the Internet, as discussed above, or via one or more additional networks using a variety of communication protocols and services, such as virtual private networks, wide area networks, or enterprise networks. The vast majority of financial institutions around the world are interconnected to one sort of network or another. One common network the financial institutions are tied to is the electronic funds transfer network over which the automated teller machines communicate and through which financial institutions accomplish money wire transfers.

It will be appreciated that the systems, methods and computer program products of the present invention can benefit other business industries besides just accounting. There exists opportunity to help facilitate credit checks, loan applications, governmental audits, and verifications of deposit as well as other opportunities. Specifically, the principles of the present invention can be used to sample receivables and payables in the auditing or other similar processes. Similar benefits and methods apply to sampling these transactions.

As with the current practice of bank confirmations, the client has control over where the receivables and payables confirmations are mailed. Using the principles of the present invention, the accountant's susceptibility to fraud is greatly reduced. The provider of the systems of the present invention, in the role of a third-party intermediary, has no relationship with the company being audited and therefore adds an additional layer of security to the confirmation process.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing financial information of a client to an accountant over a communications network, comprising:
   receiving and storing, at a service provider computer, client financial information transmitted from a financial institution computer, wherein the client financial information includes financial information and one or more account numbers uniquely identifying the client financial information;
   receiving by the service provider an accountant identification data from an accountant computer;
   receiving at the financial institution computer a request from a client computer to generate a PIN;
   generating the PIN by the financial institution computer;
   transmitting the PIN to the client computer;
   transmitting the PIN from the client computer to the service provider computer;
   transmitting an identifier and an account code from the client computer to the accountant computer;
   authenticating the accountant by the service provider using the accountant identification data;
   receiving by the service provider the identifier and the account code from the accountant computer;
   comparing the PIN with the identifier, and the account code with the account identifier, and based on the comparison retrieving client financial information using the account code; and
   transmitting the client financial information to the accountant computer.

2. The method of claim 1, further comprising protecting received client financial information using secure communication protocols.

3. The method of claim 1, wherein the client financial information includes a date and an account balance as of the date.

4. The method of claim 1, wherein the communications network is an open communications network.

5. The method of claim 1, wherein the communications network is a virtual private network.

6. The method of claim 1, wherein receiving the client financial information further comprises receiving one or more bank account numbers of the client.

7. The method of claim 1, wherein receiving the account code further comprises receiving one or more bank account numbers.

8. The method of claim 1, wherein PIN is valid for a predetermined time period or number of uses.

9. The method of claim 1 wherein the financial institution computer transmits client financial information on a periodic basis.

10. The method of claim 1 wherein the financial institution computer transmits client financial information on an as needed basis.

11. The method of claim 1 wherein the accountant identification data further comprises identification information, authorization information, and payment information.

12. A system for providing financial information of a client to an accountant over a communications network: comprising:
   means for receiving and storing, at a service provider computer, client financial information transmitted from a financial institution computer, wherein the client financial information includes financial information and an account number uniquely identifying the client financial information;
   means for receiving by the service provider an accountant identification data from an accountant computer;
   means for receiving at the financial institution computer a request from a client computer to generate a PIN;
   means for generating the PIN by the financial institution computer;
   means for transmitting the PIN to the client computer;
   means for transmitting the PIN from the client computer to the service provider computer;
   means for transmitting an identifier and an account code from the client computer to the accountant computer;
   means for authenticating the accountant by the service provider using the accountant identification data;
   means for receiving by the service provider the identifier and the account code from the accountant computer;
   means for comparing the PIN with the identifier, and the account code with the account identifier, and based on the comparison retrieving client financial information using the account code; and
   means for transmitting the client financial information to the accountant computer.

13. A processor-readable medium containing computer program instructions for providing financial information of a client to an accountant over a communications network that will cause a processor to:
   receive and store, at a service provider computer, client financial information transmitted from a financial institution computer, wherein the client financial information includes financial information and an account number uniquely identifying the client financial information;
   receive at the service provider computer an accountant identification data from an accountant computer;
   receive at the financial institution computer a request from a client computer to generate a PIN;
   generate the PIN by the financial institution computer;
   transmit the PIN to the client computer;
   transmit the PIN from the client computer to the service provider computer;
   transmit an identifier and an account code from the client computer to the accountant computer;
   authenticate the accountant by the service provider using the accountant identification data;
   receive at the service provider computer the identifier and the account code from the accountant computer;
   compare the PIN with the identifier, and the account code with the account identifier, and, based on the comparison, retrieve client financial information using the account code; and
   transmit the client financial information to the accountant computer.

* * * * *